(12) United States Patent
Chen et al.

(10) Patent No.: US 11,132,219 B2
(45) Date of Patent: Sep. 28, 2021

(54) STARTING METHOD FOR APPLICATIONS WHICH ARE CLOSED AUTOMATICALLY BASED ON THE INSUFFICIENT MEMORY OF THE SYSTEM

(71) Applicant: HUAWEI TECHNOLOGIES CO., LTD., Guangdong (CN)

(72) Inventors: Qiulin Chen, Shanghai (CN); Bailin Wen, Hangzhou (CN); Xicai Chen, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 29 days.

(21) Appl. No.: 16/277,559

(22) Filed: Feb. 15, 2019

(65) Prior Publication Data

US 2019/0179662 A1 Jun. 13, 2019

Related U.S. Application Data

(63) Continuation of application No. PCT/CN2017/079792, filed on Apr. 7, 2017.

(30) Foreign Application Priority Data

Aug. 17, 2016 (CN) .......................... 201610680862.2

(51) Int. Cl.
*G06F 9/48* (2006.01)
*G06F 12/02* (2006.01)

(52) U.S. Cl.
CPC .............. *G06F 9/485* (2013.01); *G06F 9/48* (2013.01); *G06F 9/4843* (2013.01); *G06F 9/4881* (2013.01); *G06F 12/023* (2013.01)

(58) Field of Classification Search
None
See application file for complete search history.

(56) References Cited

U.S. PATENT DOCUMENTS

| | | | |
|---|---|---|---|
| 5,907,701 A | * | 5/1999 | Hanson ................. G06F 9/4843 718/101 |
| 6,910,210 B1 | | 6/2005 | Chew |
| 7,275,150 B2 | | 9/2007 | Pagan |

(Continued)

FOREIGN PATENT DOCUMENTS

| CN | 101142556 A | 3/2008 |
|---|---|---|
| CN | 102117234 A | 7/2011 |

(Continued)

OTHER PUBLICATIONS

Kim et al. "Accelerating Application Start-Up With Nonvolatile Memory in Android Systems", 2015 IEEE, pp. 15-25.*

(Continued)

*Primary Examiner* — Van H Nguyen
(74) *Attorney, Agent, or Firm* — Conley Rose, P.C.

(57) ABSTRACT

A method and related apparatus for restarting an application being closed because of insufficient memory are provided. The method includes storing application identifiers of the applications which are closed when the free memory of the system is insufficient into a target application list, then when determining the free memory of the system is greater than a preset threshold, automatically starting a process of at least one application indicating by the target application lists.

15 Claims, 6 Drawing Sheets

---

A terminal obtains a target application list when a size of free memory is greater than a preset threshold ⎯ 200

The terminal starts, in the background, a process of an application identified by at least one identifier in the target application list ⎯ 201

(56) References Cited

U.S. PATENT DOCUMENTS

| | | | |
|---|---|---|---|
| 9,250,958 B2* | 2/2016 | Mark | H04W 4/027 |
| 9,451,159 B2* | 9/2016 | Li | H04N 5/23296 |
| 9,535,771 B2* | 1/2017 | Watson | G06F 9/5022 |
| 10,102,034 B2* | 10/2018 | Luo | G06F 9/485 |
| 10,114,661 B2* | 10/2018 | Funk | H04L 65/4084 |
| 10,264,319 B2* | 4/2019 | Magahern | H04N 21/4668 |
| 10,747,467 B2* | 8/2020 | Dzeryn | G06F 3/0653 |
| 2005/0080874 A1 | 4/2005 | Fujiwara et al. | |
| 2005/0265531 A1* | 12/2005 | Mika | H04M 1/72563 379/201.01 |
| 2006/0085787 A1* | 4/2006 | Breslaw | G06F 9/485 718/100 |
| 2006/0136882 A1 | 6/2006 | Noonan et al. | |
| 2006/0218502 A1 | 9/2006 | Matthews et al. | |
| 2012/0102504 A1 | 4/2012 | Iyer et al. | |
| 2012/0324481 A1* | 12/2012 | Xia | G06F 9/485 719/320 |
| 2014/0143791 A1 | 5/2014 | Mark et al. | |
| 2015/0278033 A1 | 10/2015 | Hou | |
| 2018/0307600 A1 | 10/2018 | Wang et al. | |

FOREIGN PATENT DOCUMENTS

| | | |
|---|---|---|
| CN | 102129475 A | 7/2011 |
| CN | 102609276 A | 7/2012 |
| CN | 102984580 A | 3/2013 |
| CN | 103024190 A | 4/2013 |
| CN | 103530235 A | 1/2014 |
| CN | 105242973 A | 1/2016 |
| CN | 105335099 A | 2/2016 |
| CN | 105335244 A | 2/2016 |
| CN | 105701025 A | 6/2016 |
| CN | 105740078 A | 7/2016 |
| CN | 105786552 A | 7/2016 |
| CN | 105824700 A | 8/2016 |
| EP | 2993584 A1 | 3/2016 |
| JP | 2012027621 A | 2/2012 |
| KR | 20070087133 A | 8/2007 |
| KR | 20070113245 A | 11/2007 |
| KR | 20130127445 A | 11/2013 |
| TW | 201232400 A | 8/2012 |
| WO | 2014089734 A1 | 6/2014 |
| WO | 2015074458 A1 | 5/2015 |

OTHER PUBLICATIONS

Machine Translation and Abstract of Chinese Publication No. CN103530235, Jan. 22, 2014, 22 pages.
Machine Translation and Abstract of Chinese Publication No. CN105242973, Jan. 13, 2016, 11 pages.
Machine Translation and Abstract of Chinese Publication No. CN105740078, Jul. 6, 2016, 26 pages.
Machine Translation and Abstract of Taiwanese Publication No. TW201232400, Part 1, Aug. 1, 2012, 14 pages.
Machine Translation and Abstract of Taiwanese Publication No. TW201232400, Part 2, Aug. 1, 2012, 4 pages.
Prodduturi, R., "Effective Handling of Low Memory Scenarios in Android using Logs," XP55244585, M.Tech Dissertation Report, Jun. 20, 2013, 75 pages.
Foreign Communication From a Counterpart Application, European Application No. 17840758.1, Extended European Search Report dated Jul. 24, 2019, 8 pages.
Foreign Communication From a Counterpart Application, Chinese Application No. 201610680862.2, Chinese Office Action dated Jul. 25, 2019, 8 pages.
Machine Translation and Abstract of Chinese Publication No. CN102117234, Jul. 6, 2011, 9 pages.
Machine Translation and Abstract of Chinese Publication No. CN102129475, Jul. 20, 2011, 14 pages.
Machine Translation and Abstract of Chinese Publication No. CN102984580, Part 1, Mar. 20, 2013, 28 pages.
Machine Translation and Abstract of Chinese Publication No. CN102984580, Part 1, Mar. 20, 2013, 9 pages.
Machine Translation and Abstract of Chinese Publication No. CN103024190, Apr. 3, 2013, 12 pages.
Machine Translation and Abstract of Chinese Publication No. CN105335099, Feb. 17, 2016, 32 pages.
Machine Translation and Abstract of Chinese Publication No. CN105335244, Feb. 17, 2016, 9 pages.
Foreign Communication From a Counterpart Application, PCT Application No. PCT/CN2017/079792, English Translation of International Search Report dated Jul. 6, 2017, 2 pages.
Foreign Communication From a Counterpart Application, PCT Application No. PCT/CN2017/079792, English Translation of Written Opinion dated Jul. 6, 2017, 4 pages.

* cited by examiner

STARTING METHOD FOR APPLICATIONS WHICH ARE CLOSED AUTOMATICALLY BASED ON THE INSUFFICIENT MEMORY OF THE SYSTEM

CROSS-REFERENCE TO RELATED APPLICATIONS

This application is a continuation of International Application No. PCT/CN2017/079792, filed on Apr. 7, 2017, which claims priority to Chinese Patent Application No. 201610680862.2, filed on Aug. 17, 2016. The disclosures of the aforementioned applications are hereby incorporated by reference in their entireties.

TECHNICAL FIELD

The present disclosure relates to the field of wireless communications technologies, and in particular, to an application start method and apparatus.

BACKGROUND

On an Android terminal (for example, a mobile phone, a tablet, or a set top box), when an application is started or run, if free memory of a system is insufficient, the terminal may kill, based on an LMKlow memory killer (LMK) mechanism, an application or a service running in the background to reclaim memory, so as to ensure running of the foreground application. For example, as for an Android mobile phone, before using a camera, a user has started applications such as a chat application, a game application, a news application, a map application, and a video application. After the user opens the camera, all the applications running in the background exit because large memory is needed. Therefore, some applications that are relatively important to the user are closed, causing inconvenience for use. In addition, it takes a relatively long time to start an exited application again.

To avoid closing some applications that are relatively important to a user, a whitelist is preset in a terminal in the prior art, and identifiers of the applications are stored in the whitelist. When an application needs to be closed to release memory, an application identified by an identifier of an application stored in the whitelist is not closed. However, in this whitelist manner of avoiding killing an application, when an application needing large memory runs, the application corresponding to the identifier of the application stored in the whitelist may also be killed. Therefore, to reduce restart duration of the application when the user starts the application again, the terminal restarts, when placed statically or powered-on, a process of the application identified by the identifier of the application in the whitelist.

However, the identifiers of the applications in the whitelist are fixed, and when the terminal is placed statically or powered-on, if the terminal cannot satisfy memory needed for running an application, a background application may be repeatedly killed or restarted, seriously affecting system performance, and affecting user experience.

SUMMARY

Embodiments of the present disclosure provide an application start method and apparatus, so as to improve system performance of a terminal, and avoid, to some extent, a phenomenon in which a background application of the terminal is repeatedly restarted and killed.

The following first describes terms in the embodiments of the present disclosure.

Free memory: remaining memory, other than memory that is occupied by a current running application program and other data, in all memory.

Process of an application: a running activity of a program about a data set, a basic unit of resource allocation and scheduling by a system, and a basis for an operating system structure. The program is a description of an instruction, data and an organization form of the instruction and the data, and the process is an entity of the program.

Activity: an application program component that provides a screen or a window and may be used by a user for interaction to implement a task. All operations in an activity are closely related to the user, and the activity is a component responsible for interaction with the user, and may display a specified control by using setContentView (View). In an Android application, an activity is usually a single screen that may display some controls or may monitor and process a user event to make a response.

Task task: A task includes multiple activities, and specifically, a task is an "application" in terms of user experience. The task combines related activities together and manages the related activities in a stack manner.

According to a first aspect, an embodiment of the present disclosure provides an application start method. The method includes: obtaining, by a terminal, a target application list when a size of free memory is greater than a preset threshold, and starting, in the background, a process of an application identified by at least one identifier in the target application list, where the target application list is used to store an identifier of an application whose memory is released last time, and the identifier of the application is used to uniquely identify the application. For example, the identifier of the application may be a package name. In an example of an SMS application, a package name of the application program is com.android.mms.

When the size of the free memory is greater than the preset threshold, the terminal triggers starting, in the background, the application (for example, a closed application) whose memory is released last time, so that the previously closed application is automatically restarted when memory is sufficient. Therefore, the following phenomenon in the prior art is avoided to some extent: A terminal automatically restarts, in the background, a process of an application when there is relatively small free memory; then because the free memory is insufficient to run the process of the application, the application is closed; and because memory is released after the application is closed, the process of the application is restarted in the background, resulting in repeatedly restarting and closing of the application. Moreover, because an identifier of an application stored in the target application list is the identifier of the application whose memory is released last time, the identifier of the application stored in the target application list can dynamically change with a different application whose memory is released. In comparison with the prior art in which a terminal starts a process of an application according to an identifier of an application that is set in a whitelist, the terminal in this embodiment of the present disclosure starts, in the background, the process of the application according to the target application list, and the terminal can start, in the background, the process of the application according to the application whose memory is released, improving a probability of starting a process of an application needed by a user, and thereby improving user experience to some extent.

Based on the first aspect, in a first implementation, the terminal starts, in the background, an activity of the application identified by the at least one identifier. In this way, when a user needs to open, in the foreground, an application whose activity is started in the background, duration needed for opening the application in the foreground is greatly reduced in comparison with an application of which only a process is started in the background. Therefore, user experience is improved to some extent.

It should be noted that the terminal may start, in the background after starting, in the background, the process of the application identified by the at least one identifier in the target application list, the activity of the application identified by the at least one identifier, or may simultaneously start, in the background, the process and the activity of the application identified by the at least one identifier. A sequence of starting the process and the activity is not limited in this embodiment of the present disclosure.

Based on the first implementation of the first aspect, in a second implementation, a specific manner of starting, in the background by the terminal, the activity of the application identified by the at least one identifier in the target application list includes the following steps: creating, by the terminal, a new task task for an application identified by one of the at least one identifier; and if it is determined that a stack stack used to store a task does not include an application stack other than a desktop stack, creating an application stack, and storing the new task into the created application stack, where the created application stack is located at a stack bottom of the stack, and the desktop stack is located at a stack top of the stack; or if it is determined that a stack includes not only a desktop stack but also an application stack that stores a task for another application different from the application identified by the at least one identifier, storing the new task into the application stack that stores the task for the another application, where the application stack that stores the task for the another application is located at a stack top of the stack, the desktop stack is located at a stack bottom of the stack, and a storage location of the new task is close to a stack bottom of the application stack that stores the task for the another application. The terminal can store the created new task to the storage location below another task, and therefore the activity of the application is started in the background.

Based on any implementation of the first aspect to the second implementation of the first aspect, in a third implementation, the application whose process is started in the background by the terminal is an application that is identified by the at least one identifier in the target application list and whose priority ranks in the top n in the target application list, and a size of memory occupied by the started application is not greater than the size of the free memory, where n is greater than 0. In this way, an application of a relatively high priority can be started preferentially, so as to avoid affecting user experience. For example, the terminal turns off WiFi (Wireless Fidelity, wireless fidelity), and because a priority of the application is relatively high, if a process of the application is not preferentially started in the background, Internet surfing of a user may be affected, and user experience may be degraded.

It should be understood that the priority of the application may be stored in the target application list, or stored in a list that is additionally set, and when needing to read the priority of the application, the terminal reads the priority of the application from a corresponding list.

Because the size of the free memory is limited, based on any implementation of the first aspect to the second implementation of the first aspect, in a fourth implementation, the application whose process is started in the background by the terminal is an application that is identified by the at least one identifier in the target application list and whose use quantity is not less than a preset threshold, and a size of memory occupied by the started application is not greater than the size of the free memory. In this way, an application that is frequently used by a user can be started preferentially in a case of the limited free memory, and duration needed for starting the application by the user in the foreground can be greatly reduced, thereby improving user experience. Specifically, a quantity of use times may be measured by using power consumption of the application, a quantity of times of tapping an icon of the application on a display screen, and the like.

It should be understood that, in the fourth implementation, the use frequency of the application should be stored in the target application list, or the use frequency of the application should be stored in a list that is additionally set, and when needing to read the use frequency of the application, the terminal reads the use frequency of the application from a storing list.

Based on the implementation of the third or the fourth implementation, in a fifth implementation, if the size of the free memory permits, the terminal starts, in the background, a process of an associated application, where the associated application is an application associated with the application that is identified by the at least one identifier and that is in applications identified by identifiers stored in the target application list. For example, the identified application is a camera application, and an application associated with the camera is a gallery application (or referred to as a photo application). If the size of the free memory permits, a process of the gallery application is simultaneously started when a process of the camera is started in the background, so that when a user uses the camera and needs to view a photo, the photo can be opened fast by using the camera, thereby further improving user experience.

It should be noted that, in the fifth implementation, a sequence of starting the associated application and the application identified by the at least one identifier in the target application list is not limited. Specifically, the terminal may first start, in the background, the process of the application identified by the at least one identifier in the target application list, and then start, in the background, the process of the associated application; or the terminal first starts, in the background, the process of the associated application, and then starts, in the background, the process of the application identified by the at least one identifier in the target application list.

Based on any implementation of the first aspect to the fifth implementation of the first aspect, when exiting or killing an application or exiting an operation of an application or being powered-on and started, the terminal may trigger determining whether the size of the free memory is greater than the preset threshold.

In addition, when the terminal starts, in the background, processes and activities of applications, a size of memory occupied by each application is recorded. When a recorded size of free memory occupied by all the started applications is less than (or far less than) the size of the free memory, and if the target application list still has an application needing to be started in the background, a process and an activity of the application may still be started in the background. Moreover, when the recorded size of the free memory occupied by all the started applications is equal to (or close to) the size of the free memory, the terminal stops starting, in the background, a process and an activity of an application.

It should be understood that, herein a purpose of recording and monitoring the size of the memory occupied by the applications started in the background is to prevent excessive memory occupation of the terminal from affecting a running speed of the terminal. A specific memory monitoring manner is not limited in the present disclosure. In addition, a size of memory occupied by the process and the activity of the application may be recorded in the target application list, or may be recorded in a list that is additionally set.

According to a second aspect, an embodiment of the present disclosure further provides an application start apparatus, including one or more modules capable of implementing the first aspect or any implementation of the first aspect, where each module may perform one or more steps.

According to a third aspect, an embodiment of the present disclosure further provides a terminal device. The terminal device includes a processor and a memory, where the memory is configured to store a software program, and the processor is configured to read the software program stored in the memory and implement the method provided in the first aspect or any implementation of the first aspect.

According to a fourth aspect, an embodiment of the present disclosure further provides a computer storage medium. The computer storage medium may be nonvolatile, that is, content cannot be lost after a power failure. A software program is stored in the storage medium, and when the software program is read and executed by one or more processors, the method provided in the first aspect or any implementation of the first aspect can be implemented.

DESCRIPTION OF EMBODIMENTS

To make the objectives, technical solutions, and advantages of the present disclosure clearer, the following further describes the present disclosure in detail with reference to the accompanying drawings.

It should be understood that an application start method in an embodiment of the present disclosure is mainly applied to a terminal. The terminal is also referred to as UE (User Equipment, user equipment), an MS (Mobile Station, mobile station), a mobile terminal (Mobile Terminal), or the like. Optionally, the terminal may be a mobile phone, a tablet computer, a PDA (Personal Digital Assistant, personal digital assistant), a POS (Point of Sales, point of sales), a vehicle-mounted computer, a set top box, or the like.

In the application start method according to this embodiment of the present disclosure, when a size of free memory is greater than a preset threshold, the terminal triggers starting, in the background, an application (for example, a closed application) whose memory is released last time, so that the following phenomenon in the prior art is avoided to some extent: Without performing determining on a size of free memory, a terminal may automatically restart, in the background, a process of an application when there is relatively small free memory, resulting in repeatedly restarting and closing of the application. Moreover, because an identifier of an application stored in a target application list is an identifier of the application whose memory is released last time, the identifier of the application stored in the target application list dynamically changes with a different application whose memory is released. Compared with the prior art in which a terminal presets a whitelist that cannot indicate a dynamic change of an application whose memory is released, the application start method in this embodiment of the present disclosure is more targeted when the terminal starts a process of an application, and a probability of starting a process of an application needed by a user is improved to some extent.

Figure 1:
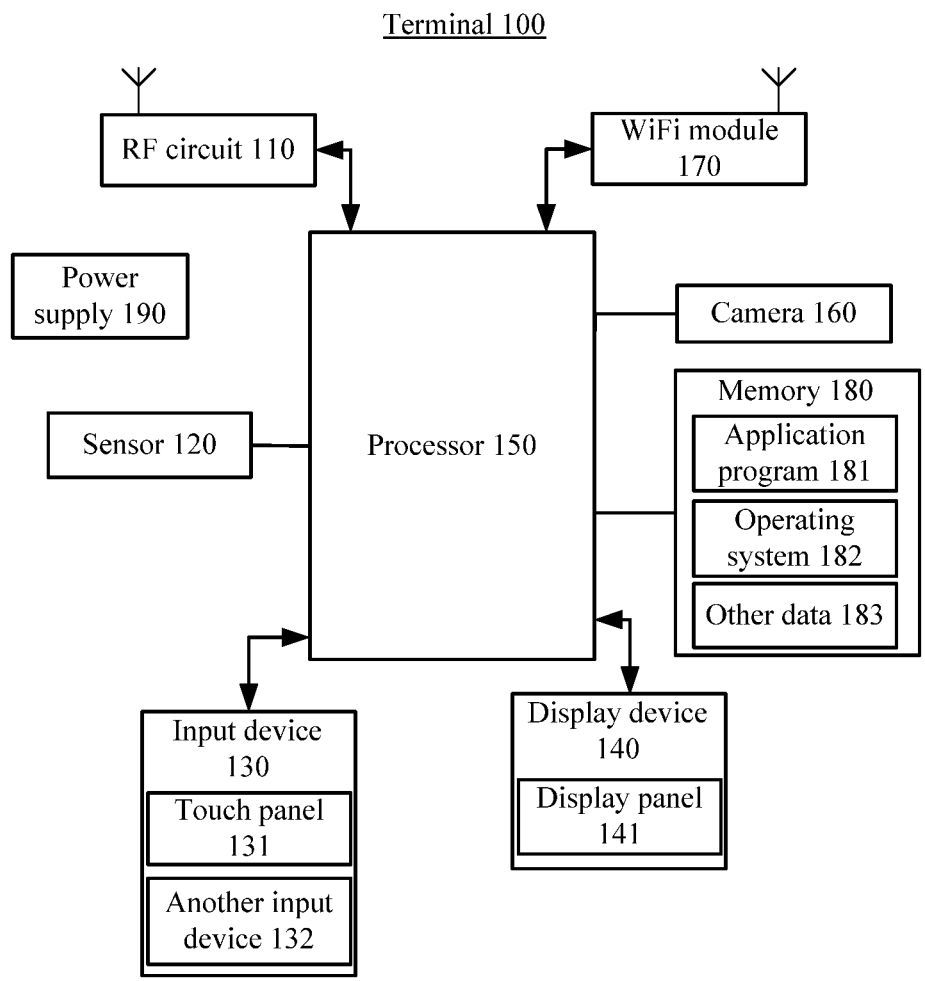
FIG. 1 is a schematic diagram of a hardware structure of a terminal according to an embodiment of the present disclosure.

Referring to FIG. 1, FIG. 1 is a schematic diagram of a hardware structure of a terminal to which an embodiment of the present disclosure is applied. As shown in FIG. 1, the terminal 100 includes a display device 140, a processor 150, and a memory 180. The memory 180 generally includes an internal memory and an external memory, and the internal memory may be a random access memory (RAM), a read-only memory (ROM), a cache, or the like. The external memory may be a hard disk, an optical disc, a USB flash drive, a floppy disk, a tape drive, or the like. The memory 180 is configured to store a computer program and other data 183. The computer program includes an operating system 182, an application program 181, and the like. The other data 183 may include data generated after the operating system 182 or the application program 181 is run, and the data includes system data (for example, configuration parameters of the operating system) and user data. For example, a photo shot by a user is typical user data. Moreover, a target application list in this embodiment of the present disclosure is data generated after the application program is run. The computer program and the other data are usually stored into the external memory, and the processor may load the computer program or the other data from the external memory to the internal memory before performing processing or calling data. The target application list in this embodiment of the present disclosure may be stored into the external memory or the internal memory. When the target application list is stored into the external memory, the processor needs to first load the target application list from the external memory to the internal memory when needing to obtain the target application list.

The processor 150 is configured to read the computer program and then execute a method defined in the computer program. For example, the processor 150 reads the operating system 182, so as to run the operating system on the terminal 100 and implement various functions of the operating system; or the processor 150 reads one or more application programs 181, so as to run the application on the terminal 100. The processor 150 may include one or more general purpose processors, or may include one or more DSPs (Digital Signal Processor, digital signal processor), and is configured to perform related operations to implement a technical solution provided in this embodiment of the present disclosure.

The operating system 182 includes the computer program capable of implementing an application start method provided in this embodiment of the present disclosure, so that after the processor 150 reads the operating system 182 and runs the operating system, the operating system may have a function, provided in this embodiment of the present disclosure, of starting, in the background, a process of an application. Specifically, the operating system may open, to an application at an upper layer, a call interface for starting, in the background, a process of an application, and the processor 150 reads the application program 181 from the memory 180, and runs, in the background, the process of the application.

The terminal 100 may further include an input device 130 configured to: receive entered digit information, entered character information, or an entered contact touch operation/non-contact gesture, generate a signal input related to user setting and function control of the terminal 100, and the like. Specifically, in this embodiment of the present disclosure, the input device 130 may include a touch panel 131. The touch panel 131, also referred to as a touchscreen, may collect a touch operation (such as an operation performed by a user on the touch panel 131 or near the touch panel 131 by using a finger or any proper object or accessory such as a stylus) of the user on or near the touch panel, and drive a corresponding connection apparatus according to a preset program. Optionally, the touch panel 131 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into touch coordinates, and sends the touch coordinates to the processor 150, and can receive and execute a command sent by the processor 150. For example, a user taps a picture on the touch panel 131 by using a finger. The touch detection apparatus detects a signal brought by the tap, and then sends the signal to the touch controller. The touch controller converts the signal into coordinates, and sends the coordinates to the processor 150. The processor 150 determines, according to the coordinates and a type (tap or double tap) of the signal, an operation (for example, picture enlargement or picture full-screen display) to be performed on the picture, and then determines memory space needing to be occupied for performing the operation. If the memory space needing to be occupied is less than free memory, the picture is displayed on a display panel 141 in full screen mode to implement "opening" of the picture. If the memory space needing to be occupied is greater than the free memory, an application running in the background is killed, or an application running in the background is frozen, to release a part of memory, so that the terminal can display the picture on the display panel 141 in full screen mode.

The touch panel 131 may be implemented in various types, such as a resistive type, a capacitive type, an infrared type, and a surface acoustic wave type. In addition to the touch panel 131, the input device 130 may further include another input device 132. The another input device 132 may include but is not limited to one or more of the following: a physical keyboard, a function key (such as a volume control key and an on/off key), a trackball, a mouse, a joystick, and the like.

The terminal 100 may further include a display device 140. The display device 140 includes the display panel 141 and is configured to display information entered by a user or information provided for the user, multiple menu windows of the terminal device 100, and the like. In this embodiment of the present disclosure, the display device 140 is mainly configured to display an icon of an application installed in the terminal 100. The display device 140 may include the display panel 141. Optionally, the display panel 141 may be configured in a form such as an LCD (Liquid Crystal Display, liquid crystal display) or an OLED (Organic Light-Emitting Diode, organic light-emitting diode). In other embodiments, the touch panel 131 may cover the display panel 141 to form a touch display screen.

In addition, the terminal 100 may further include a power supply 190 configured to supply power to another module and a camera 160 configured to shoot a photo or a video. The terminal 100 may further include one or more sensors 120, such as an acceleration sensor and an optical sensor. The terminal 100 may further include a radio frequency (Radio Frequency, RF) circuit 110 configured to perform network communication with a wireless network device, and may further include a WiFi module 170 configured to perform WiFi communication with another device.

Figure 2:
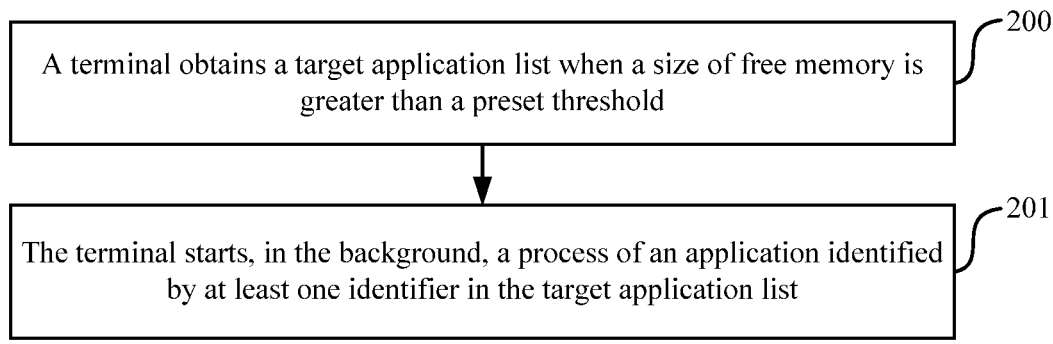
FIG. 2 is a schematic flowchart of an application start method according to an embodiment of the present disclosure.

An application start method provided in an embodiment of the present disclosure may be implemented in the operating system 182 shown in FIG. 1. Specifically, as shown in FIG. 2, the application start method in this embodiment of the present disclosure includes the following steps:

Step 200: A terminal obtains a target application list when a size of free memory is greater than a preset threshold, where the target application list is used to store an identifier of an application whose memory is released last time, and the identifier of the application is used to uniquely identify the application.

Step 201: The terminal starts, in the background, a process of an application identified by at least one identifier in the target application list.

It should be understood that the free memory in this embodiment of the present disclosure is remaining memory, other than memory that is occupied by a current running application program and other data, in all memory of the terminal. For example, a total size of the memory of the terminal is 2 GB, and if a size of the memory occupied by the current running application and the other data is 1.2 G, a size of the free memory is 0.8 G.

It should be understood that the preset threshold in this embodiment of the present disclosure may be set according to an actual situation.

When an application currently running in the foreground exits, or a current foreground operation exits, or another event (such as a screen-on event) that can make the free memory greater than the preset threshold occurs, the terminal determines that the free memory is greater than the preset threshold.

It should be understood that the process of the application in this embodiment of the present disclosure is a main process and a service process of the application.

Specifically, the target application list in this embodiment of the present disclosure may be generated in the following process:

When detecting that starting a new application is triggered, the terminal determines a size of memory needing to be requested to run the foregoing process. If the size of the memory needing to be requested is greater than the size of the free memory, the terminal successively releases, in ascending order of preset priorities of other applications that are different from the new application and that currently occupy memory, all or a part of memory occupied by at least one application in the other applications, until the terminal determines that a sum of the released memory and the free memory is not less than the size of the memory needing to be requested to run the new task; and stores an identifier of the application whose memory is released into the target application list.

In addition, after detecting that a new operation on the application currently running in the foreground is triggered, if the terminal determines that a size of memory to be requested to perform the new operation is greater than the size of the free memory, the terminal needs to release all or a part of memory occupied by an application running in the background to run the new operation, and in this case, the terminal stores an identifier of the application whose memory is released into the target application list.

The identifier of the application may be a package name of an application program. For example, when the application is an SMS application, the package name of the application program is com.android.mms; when the application is a contacts application, the package name of the application program is com.android.contacts. It should be understood that, in this embodiment of the present disclosure, the identifier of the application may also be a preset identifier of the application, such as an Arabic numeral or a name (such as an SMS message or a contact) of the application.

In this embodiment of the present disclosure, for one of the at least one application, if cold start duration of the application is greater than preset duration, the terminal releases, by freezing a process of the application and compressing memory occupied by the application, a part of the memory occupied by the application; or if cold start duration of the application is not greater than preset duration, the terminal releases all memory occupied by the application by exiting the application, that is, killing the application. Compressing the memory occupied by the application means compressing the memory occupied by the application into compressed memory, where the compressed memory may be a ZRAM (ZIP RAM, zip ram) or a ZSwap (Zip Swap, zip swap).

Specifically, the cold start duration is duration needed for the terminal to start the application from a completely closed state of the application.

One application priority presetting manner: In an example of the SMS application, application priorities are stored into an external memory of the terminal in advance, for example, the priorities are measured by using numbers 1 to 9, where a smaller number indicates a higher priority, that is, the number 1 indicates a highest priority and the number 9 indicates a lowest priority. When the application is installed for the terminal, a window for selecting a priority of the SMS application pops up on a display screen of the terminal, and if a user selects the number 5, the priority, stored in a memory by the terminal, of the SMS application is 5. Alternatively, in implementation, a priority resetting option may be set in an application of the terminal, and then the terminal reselects a new priority subsequently according to a requirement of the user. Alternatively, in implementation, a priority of an application can be set only in installation of the application, and cannot be changed once being set.

Another application priority presetting manner: A priority of an application is preset. A developer directly presets the priority of the application in development of the application.

It should be noted that the preset duration may be correspondingly set according to an actual situation.

For example, the terminal runs, in the background, an application A, an application B, an application C, an application D, and an application E. It is assumed that 1.8 G memory is occupied, and free memory is 0.2 G. Priorities of the application A and the application B are 5, a priority of the application C is 6, a priority of the application D is 3, and a priority of the application E is 4, where a larger number indicates a lower application priority. When the terminal detects that a user taps a camera client, starting the camera is triggered, and it is assumed that memory needing to be occupied for running the camera is 0.5 G. Because the memory occupied for running the camera by the terminal is greater than a size of the free memory, the terminal releases memory in ascending order of the priorities of the application A, the application B, the application C, the application D, and the application E. Specifically, because the priority of the application C in the applications running in the background is the lowest, if cold start duration of the application C is greater than the preset duration, a process of the application C is frozen by using a process freezing manager, and a program and data that are for running the application C are compressed into compressed memory. If cold start duration of the application C is not greater than the preset duration, the application C exits, that is, the application C is killed, to release all memory for running the application C by the terminal.

After all or a part of the memory occupied by the application C is released, if a sum of the free memory and the released memory is 0.8 G and is greater than the 0.5 G memory needing to be requested to run the camera, no more memory needs to be released. The terminal allocates the 0.5 G memory to the camera, runs the camera, and then stores an identifier of the application C into the target application list.

After all or a part of the memory occupied by the application C is released, if a sum of the free memory and the released memory is 0.45 G and is less than the 0.5 G memory needing to be occupied for running the camera, memory of one of the application A and the application B further needs to be released, until the terminal determines that the sum of the free memory and the released memory is not less than the memory needing to be requested to run the camera. A manner of releasing memory of one of the application A and the application B is similar to a manner of releasing memory of the application C, and details are not described herein. Then identifiers of all applications whose memory is released are stored into the target application list.

Optionally, in this embodiment of the present disclosure, after all the memory occupied by all the other applications currently occupying memory is released, when a sum of the released memory and the free memory is less than the size of the memory needing to be requested, the terminal prompts, on a display device of the terminal, prompt information indicating that the memory needing to be requested is too large.

In addition, another manner capable of releasing memory in the prior art may also be used to store the application whose memory is released into the target application list, and details are not described herein.

Specifically, in this embodiment of the present disclosure, to further reduce start duration for restarting the application, optionally, after starting the process of the application identified by the at least one identifier in the target application list, the terminal starts, in the background, an activity of the application identified by the at least one identifier in the target application list.

Specifically, an activity of an application indicates resource information related to a display window of the application. The activity of the application in this embodiment of the present disclosure is an activity of a main process of the application.

In the prior art, starting, in the background, an application means starting a main process and a service process of the application, without starting an activity of the main process. In this embodiment of the present disclosure, after the process of the application is started, the activity of the application is further started in the background, so that the start duration needed for restarting the application is further reduced.

Specifically, a manner of starting, in the background, the activity by the terminal is as follows:

creating, by the terminal, a new task task for an application identified by one of the at least one identifier; and if it is determined that a stack stack used to store a task does not include an application stack other than a desktop stack, creating, by the terminal, an application stack, and storing the new task into the created application stack, where the created application stack is located at a stack bottom of the stack, and the desktop stack is located at a stack top of the stack; or if it is determined that a stack includes not only a desktop stack but also an application stack that stores a task for another application different from all applications that are identified by identifiers stored in the target application list, storing, by the terminal, the new task into the application stack that stores the task for the another application, where the application stack is located at a stack top of the stack, the desktop stack is located at a stack bottom of the stack, and a storage location of the new task is close to a stack bottom of the application stack.

One task may include multiple activities, and the desktop stack stores a task related to a desktop.

Figure 3:
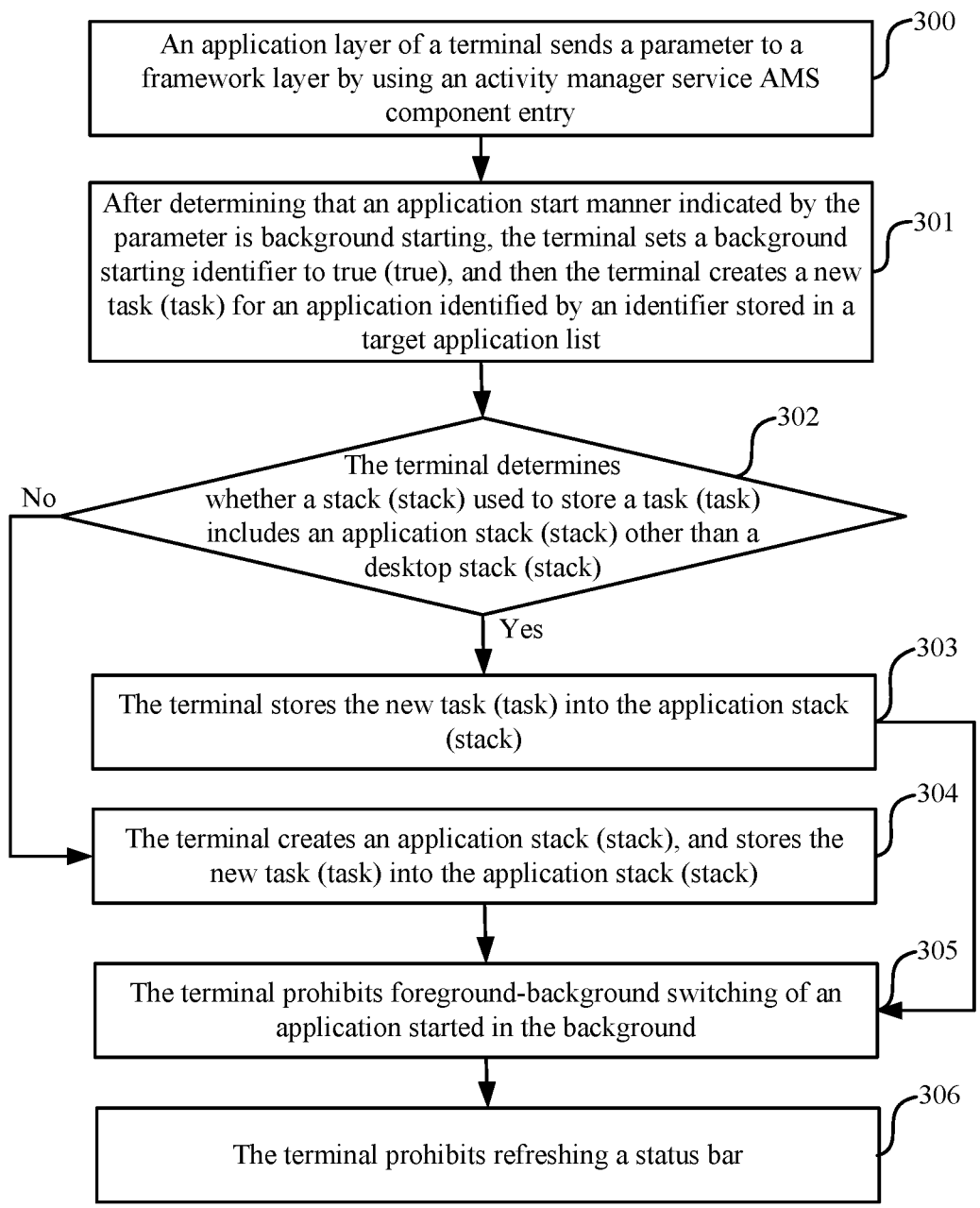
FIG. 3 is a schematic flowchart of a method for starting, in the background, an activity according to an embodiment of the present disclosure.

Specifically, as shown in FIG. 3, a method for starting, in the background, an activity of an application according to an embodiment of the present disclosure includes the following steps:

Step 300: An application layer of a terminal sends a parameter to a framework layer by using an AMS (Activity Manager Service, activity manager service) component entry, where the parameter is used to indicate an application start manner.

For example, in a technical solution of this embodiment of the present disclosure, the application start manner is background starting. It is assumed that a parameter value 1 is used to indicate that the application start manner is background starting, and a parameter value 0 is used to indicate that the application start manner is foreground starting.

Step 301: After determining that the application start manner indicated by the parameter is background starting, the terminal sets a background starting identifier to true, and then the terminal creates a new task for an application identified by an identifier stored in a target application list.

Step 302: The terminal determines whether a stack used to store a task includes an application stack other than a desktop stack, and if the stack used to store the task includes the application stack other than the desktop stack, step 303 is performed, or if the stack used to store the task does not include the application stack other than the desktop stack, step 304 is performed.

Step 303: The terminal stores the new task into the application stack, where the desktop stack is located at a stack bottom of the stack, the application stack is located at a stack top of the stack, and a storage location of the new task is close to a stack bottom of the application stack.

Figure 4A:
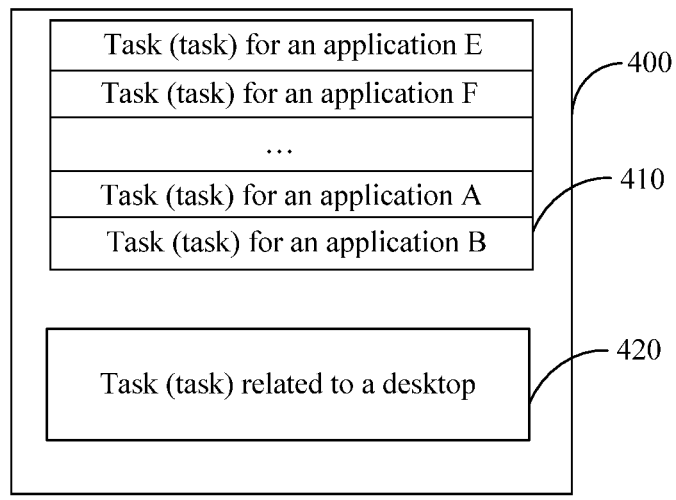
FIG. 4a and FIG. 4b are respectively schematic diagrams of a stack used to store a task according to an embodiment of the present disclosure.

As shown in FIG. 4a, a stack 400 includes an application stack 410 and a desktop stack 420. The application stack 410 is used to store a task for another application, and the desktop stack 420 is used to store a task for a desktop. The desktop stack 420 is located at a stack bottom, and the application stack 410 is located at a stack top. If the application stack 410 includes a task for an application E and a task for an application F, a window of the application E is displayed on a display device of a terminal. If a task for an application A and a task for an application B need to be stored, a created task for the application A and a created task for the application B are stored below the task for the application E in the application stack 410. Specifically, a sequence of the task for the application A and the task for the application B is not limited.

Step 304: The terminal creates an application stack, and stores a new task into the application stack, where the application stack is located at a stack bottom of the stack, and the desktop stack is located at a stack top of the stack.

Figure 4B:
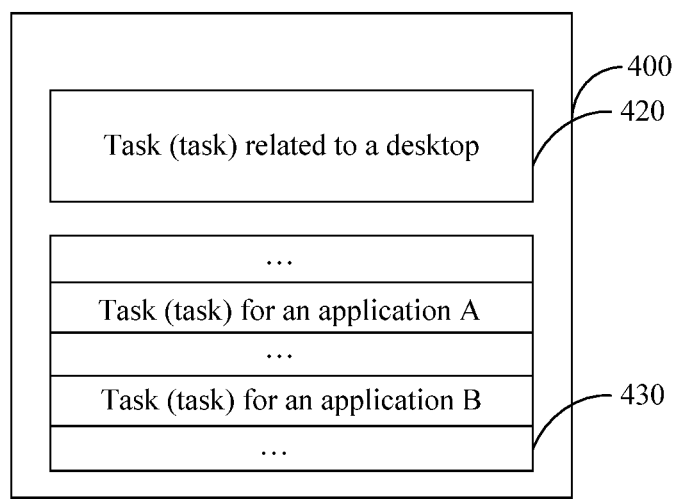

As shown in FIG. 4b, the stack 400 includes only the desktop stack 420. The task for the desktop is stored in the desktop stack 420, and the desktop is displayed on the display device of the terminal. If the task for the application A and the task for the application B need to be stored, an application stack 430 is created in the stack 400, and then the task for the application A and the task for the application B are stored into the application stack 430. The application stack 430 is located at the stack bottom, and the desktop stack 420 is located at the stack top. In this way, an activity of the application can be started in the background.

Step 305: The terminal prohibits foreground-background switching of an application started in the background.

Specifically, the terminal does not call a foreground-background switching function of the started application.

Step 306: The terminal prohibits refreshing a status bar.

Specifically, the terminal does not call a status bar refreshing function. The terminal prohibits refreshing the status bar by calling mPolicy.updateSystemUiColorLw(win) by using an addWindow function of a windows manager service.

Step 301 to Step 306 may be implemented at a framework layer of an operating system.

Specifically, this embodiment of the present disclosure further provides several optional methods for starting, in the background, a process of a corresponding application:

First method: The terminal starts, in the background, processes of applications identified by all identifiers in the target application list, where memory occupied for running the processes of the applications identified by all the identifiers in the target application list is not greater than a size of free memory.

Specifically, after determining the size of the free memory of a memory, a processor of the terminal starts, in the background, the processes of the applications identified by all the identifiers in the target application list.

For example, if identifiers of the application A, the application B, an application C, and an application D are stored in the target application list, processes of the application A, the application B, the application C, and the application D are run in the background, but a size of memory occupied for running the processes of the application A, the application B, the application C, and the application D is not greater than the size of the free memory.

If the processes of the applications identified by all the identifiers in the target application list are started in the background, and the memory occupied for running the applications is greater than the size of the free memory, the terminal has different specific implementations according to different policies. For example, because the memory occupied for running the applications is greater than the size of the free memory, the terminal selects some identifiers in the target application list, and then starts, in the background, processes of applications identified by the selected identifiers; or when the memory occupied for running the applications is greater than the size of the free memory, the terminal does not start, in the background, the processes of the applications identified by the identifiers in the target application list.

Second method: The terminal starts, in the background, a process of an application identified by at least one identifier in the target application list, where a size of memory occupied by the started process of the application identified by the at least one identifier is not greater than a size of free memory, and a priority of the application identified by the at least one identifier ranks in the top n of priorities of applications that are identified by identifiers stored in the target application list, where n is greater than 0.

A value of n is set according to a user requirement. Specifically, when the value of n is 1, it is assumed that identifiers of the application A, the application B, an application C, and an application D are stored in the target application list, a priority of the application A is 5, a priority of the application B is 6, a priority of the application C is 5, and a priority of the application D is 6, where a larger number indicates a lower priority. In this case, processes of the application A and the application C whose priorities rank the first are started in the background, where memory occupied for running the processes of the application A and the application C is not greater than the size of the free memory.

If free memory is still sufficient after the processes of the application A and the application C are started in the background, other applications may be successively started in the background in descending order of priorities of the applications, until the free memory cannot support running, in the background, the processes of the applications.

Third method: The terminal starts, in the background, a process of an application identified by at least one identifier in the target application list, where a size of memory occupied by the started process of the application identified by the at least one identifier is not greater than a size of free memory, and a quantity of times of using the application identified by the at least one identifier is not less than a preset quantity of times.

It should be noted that the preset quantity of times is set according to an actual situation, and a larger quantity of times of using an application indicates that a user may most probably use the application next. To enable the user to enter the application relatively fast when using the application, and avoid a relatively long time needed when the application is restarted, the application is started in the background in advance.

In this embodiment of the present disclosure, when the quantity of times of using the application is greater than the preset quantity of times, the application is an application that is most probably to be used by the user next. Another method for determining whether the application identified by the identifier in the target application list is the application that is most probably to be used by the user next also falls within the protection scope of the present disclosure. For example, according to power consumption, counted by using the terminal, of each application, several applications whose power consumption ranks the top are used as applications that are most probably to be used by the user next.

Fourth method: The terminal starts, in the background, a process of an associated application, where the associated application is an application associated with an application that is identified by at least one identifier and that is in applications identified by identifiers stored in the target application list.

The associated application is an application that can be opened by using the application identified by the identifier. For example, an application is a camera, and if an application that can be opened by using the camera is a photo application, the photo application is an associated application of the camera. This is also referred to as a "one-touch reachable" application.

In addition, when the process of the application is started in the foregoing four manners, the activity of the application may also be simultaneously started in the background.

In this embodiment of the present disclosure, when the process of the application is started in the background, the activity of the application is simultaneously started, so that duration needed for restarting the application in the foreground is reduced.

Table 1 shows, by using the application A, the application B, the application C, the application D, and the application E as examples, cold start duration, start duration 1 in the foreground after a process is started in the background, and start duration 2 in the foreground after a process and an activity of an application are started in the background.

TABLE 1

| Application | Cold start duration (second) | Start duration 1 (second) | Start duration 2 (second) |
|---|---|---|---|
| A | 1.96 | 0.75 | 0.432 |
| B | 2.145 | 0.884 | 0.445 |
| C | 3.3147 | 2.6117 | 0.464 |
| D | 3.847 | 2.376 | 0.659 |
| E | 5.17 | 4.8 | 0.508 |

The foregoing mainly describes a specific procedure of the method provided in this embodiment of the present disclosure. The following describes, with reference to FIG. 5 by using an Android operating system as an example, an implementation location and a runtime status of the method provided in this embodiment of the present disclosure. For a more specific method procedure, refer to descriptions in the foregoing embodiment.

Figure 5A:
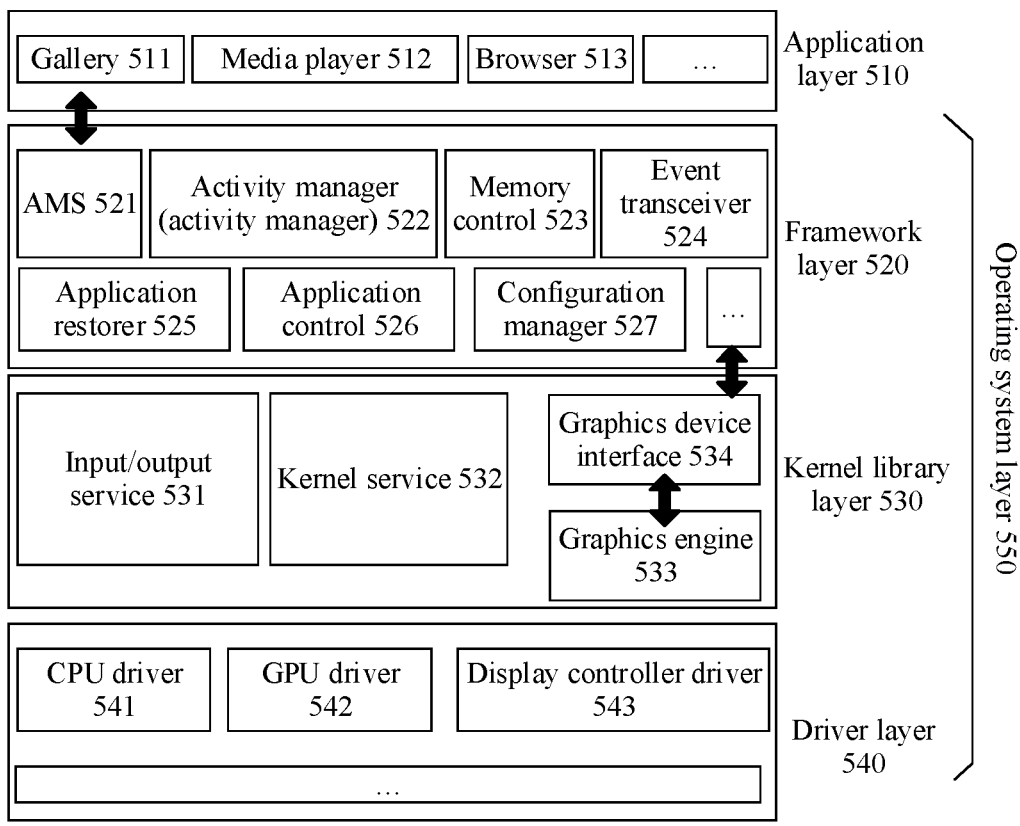
FIG. 5a is a schematic diagram of an Android operating system according to an embodiment of the present disclosure.

Referring to FIG. 5a, FIG. 5a is a schematic structural diagram of a computer system 500 according to an embodiment of the present disclosure. The computer system 500 may be a terminal, or may be another type of computer device. The computer system includes an application layer 510 and an operating system layer 550, where the operating system may be an Android operating system. The operating system layer 550 is further divided into a framework layer 520, a kernel library layer 530, and a driver layer 540. The operating system layer 550 in FIG. 5a may be considered as a specific implementation of the operating system 182 in FIG. 1, and the application layer 510 in FIG. 5a may be considered as a specific implementation of the application program 181 in FIG. 1. The driver layer 540 includes a CPU driver 541, a GPU driver 542, a display controller driver 543, and the like. The kernel library layer 530 is a kernel part of the operating system, and includes an input/output service 531, a kernel service 532, a graphics device interface 534, a graphics engine 533 for implementing CPU or GPU graphics processing, and the like. The framework layer 520 may include an AMS (activity manager service) 521, an activity manager 522, a memory control 523, an event transceiver 524, an application restorer 525, an application control 526, a configuration manager 527, and the like. The application layer 510 may include a gallery 511, a media player 512, a browser 513, and the like.

In addition, below the driver layer 540, the computer system 500 further includes a hardware layer. The hardware layer of the computer system 500 may include a central processing unit (CPU) and a graphics processing unit (GPU) (which are equivalent to a specific implementation of the processor 150 in FIG. 1), may further include a memory (which is equivalent to the memory 180 in FIG. 1) that includes an internal memory and an external memory, may further include an input device (which is equivalent to the input device 132 in FIG. 1), and a display device (which is equivalent to the display device 140 in FIG. 1) such as a liquid crystal display (LCD), a holographic imaging device, and a projector, and may further include one or more sensors (which are equivalent to the one or more sensors 120 in FIG. 1). Certainly, in addition, the hardware layer may further include a power supply, a camera, an RF circuit, and a WiFi module that are shown in FIG. 1, and may further include other hardware modules that are not shown in FIG. 1, such as a memory controller and a display controller.

The method provided in any foregoing embodiment of the present disclosure may be implemented at the framework layer shown in FIG. 5a.

Figure 5B:
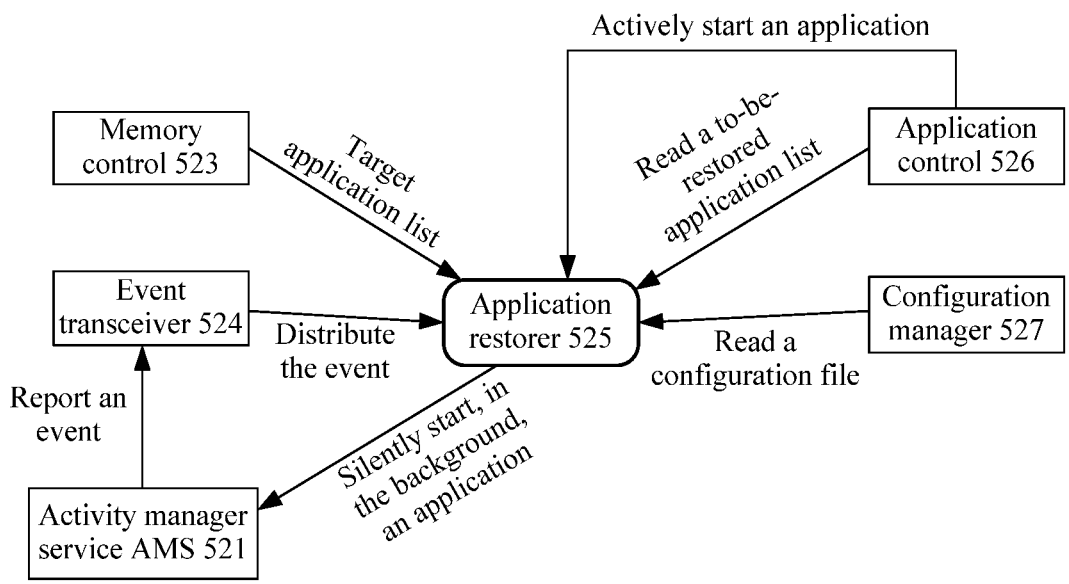
FIG. 5b is a schematic diagram of a framework layer according to an embodiment of the present disclosure.

Specifically, the framework layer in this embodiment of the present disclosure is shown in FIG. 5b. With reference to a block diagram shown in FIG. 5b, a flowchart of restarting, in the background, an application is shown in FIG. 6.

As shown in FIG. 5b, the framework layer 520 of the terminal includes the memory control 523, the configuration manager 527, the event transceiver 524, the application restorer 525, the application control 526, the configuration manager 527, and the AMS 521. The AMS is configured to collect events such as an application being killed and exited, and an application being switched to the background, and reports the events to the event transceiver 524. The event transceiver 524 is configured to provide an event distribution channel. The application control 526 is configured to provide a to-be-restored application list, intelligently predict user behavior, and initiate an application request, where the to-be-restored application list is a list of applications commonly used by a user (such as a list of applications frequently used by the user or a list of applications of relatively high priorities). The memory control 523 is configured to provide a target application list. The configuration manager 527 is configured to provide an interface for reading an extensible markup language (XML) file. In addition, the terminal in this embodiment of the present disclosure may also collect, by using an notification manager service (NMS) or a windows manager service (WMS), the events such as an application being killed and exited, and an application being switched to the background.

It should be understood that the activity manager 522 at the framework layer shown in FIG. 5a is configured to start, in the background, an activity.

Figure 6:
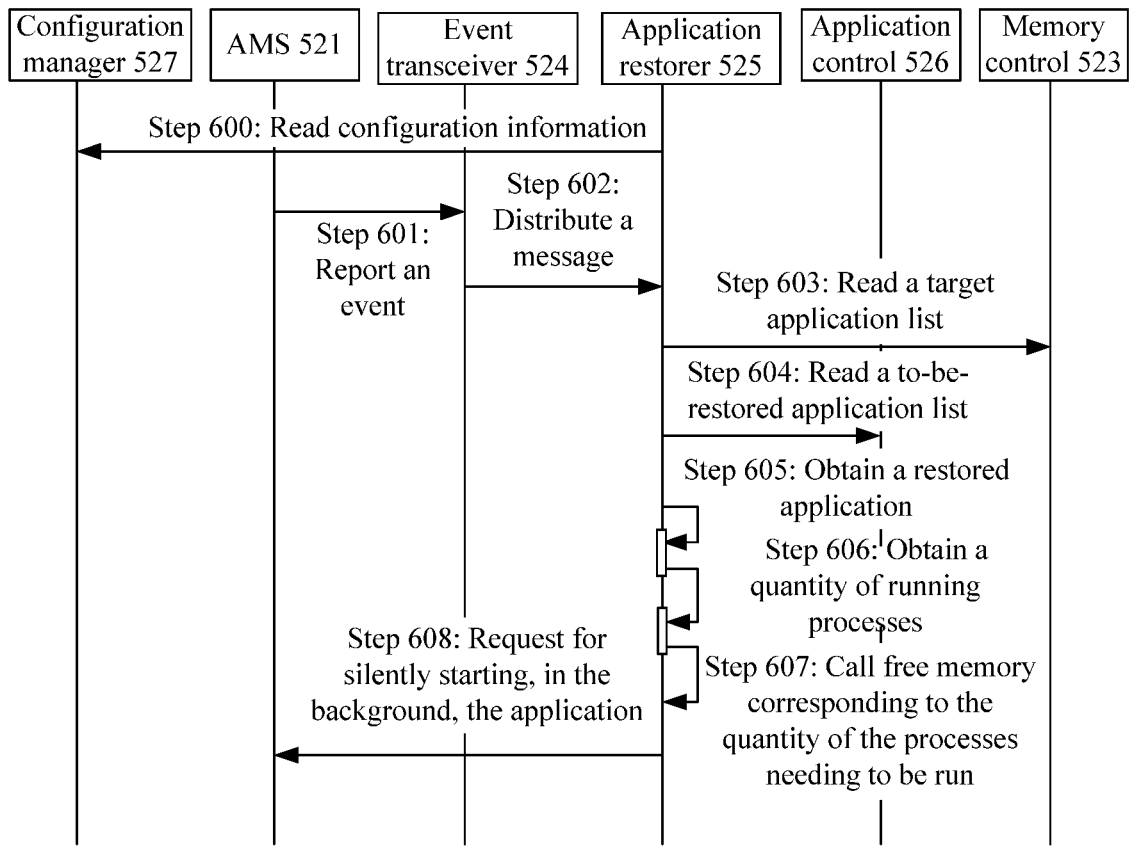
FIG. 6 is a schematic flowchart of an application start method according to an embodiment of the present disclosure.

Specifically, as shown in FIG. 6, an application start process in this embodiment of the present disclosure includes the following steps:

Step 600: The application restorer 525 reads configuration information from the configuration manager 527, where the configuration information is a configured preset threshold of free memory, and if the application restorer determines that an actual size of the free memory is greater than the preset threshold, step 601 is performed.

Step 601: The AMS 521 reports an event to the event transceiver 524, where the event is a request for starting, in the background, an application.

Step 602: After receiving the reported event, the event transceiver 524 distributes a request message for starting, in the background, the application to the application restorer 525.

Step 603: After receiving the request message for starting, in the background, the application, the application restorer 525 reads a target application list from the memory control 523, where the target application list stores an identifier of an application whose memory is released last time.

Step 604: The application restorer 525 obtains a list of restored application from the application control 526, where identifiers of applications frequently used by a user or identifiers of applications of relatively high priorities are stored in the list of restored applications.

Step 605: The application restorer 525 obtains, from the target application list, an application identifier that is the same as an application identifier stored in the list of restored applications.

Step 606: The application restorer 525 obtains a quantity of processes needing to be run.

Step 607: The application restorer 525 calls free memory corresponding to the quantity of the processes needing to be run.

Step 608: The application restorer 525 sends a request for silently starting, in the background, the application to the AMS 521. Specifically, the terminal sends the application request to the application layer 510 by using the AMS 521, and then silently starts, in the background, the application, where the application silently started in the background is an application corresponding to the application identifier that is in the target application list and that is the same as the application identifier stored in the list of restored applications.

There is no definite sequence between step 603 and step 604.

Based on a same inventive concept, an embodiment of the present disclosure further provides a terminal having an application start function in the embodiments of the present disclosure. A method corresponding to the terminal in this embodiment of the present disclosure is the application start method in the embodiments of the present disclosure. Therefore, for implementation of the terminal in this embodiment of the present disclosure, refer to the implementation of the method, and repeated descriptions are not provided herein.

Figure 7A:
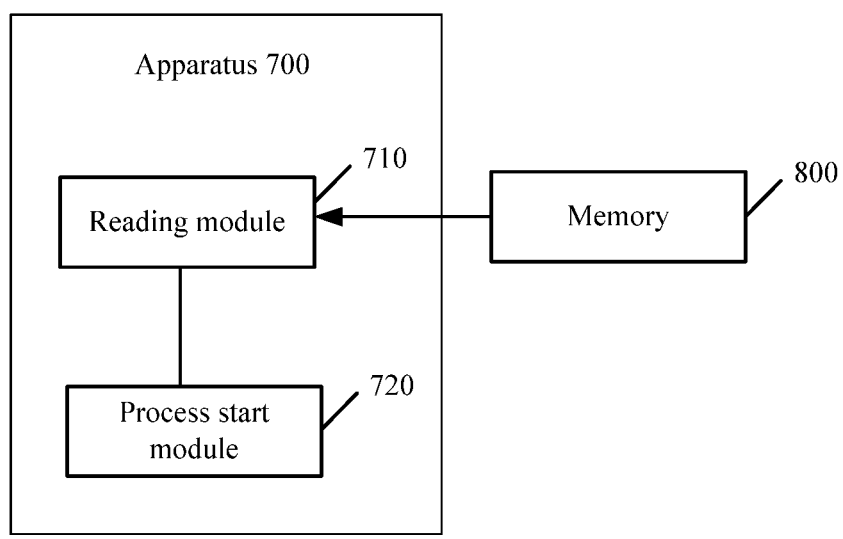
FIG. 7a and FIG. 7b are respectively schematic diagrams of an application start apparatus according to an embodiment of the present disclosure.

Referring to FIG. 7a, FIG. 7a is a schematic structural diagram of an apparatus 700 according to an embodiment of the present disclosure.

The application start apparatus includes: a reading module 710, configured to obtain a target application list in a memory 800 when a size of free memory in the memory 800 is greater than a preset threshold, where the target application list is used to store an identifier of an application whose memory is released last time, and the identifier of the application is used to uniquely identify the application; and a process start module 720, configured to start, in the background, a process of an application identified by at least one identifier in the target application list.

Figure 7B:
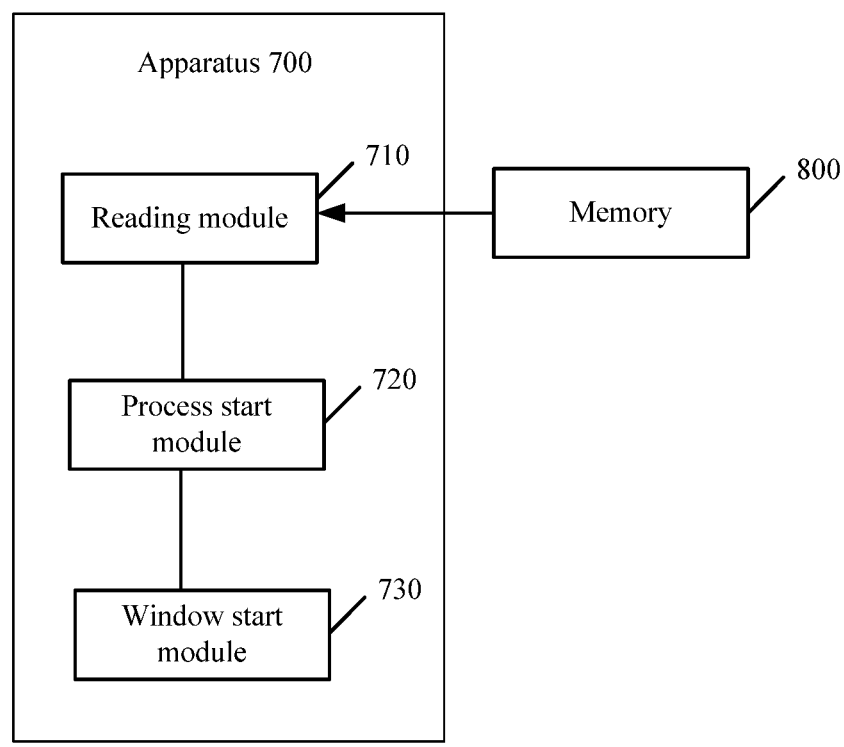

Further, as shown in FIG. 7b, the application start apparatus includes a window start module 730. The window start module 730 is configured to start, in the background, an activity of the application identified by the at least one identifier in the target application list.

Further, the window start module 730 is specifically configured to: create a new task task for an application identified by one of the at least one identifier; and if it is determined that a stack stack used to store a task does not include an application stack other than a desktop stack, create an application stack, and store the new task into the created application stack, where the created application stack is located at a stack bottom of the stack, and the desktop stack is located at a stack top of the stack; or if it is determined that a stack includes not only a desktop stack but also an application stack that stores a task for another application different from all applications that are identified by identifiers stored in the target application list, store the new task into the application stack that stores the task for the another application, where the application stack that stores the task for the another application is located at a stack top of the stack, the desktop stack is located at a stack bottom of the stack, and a storage location of the new task is close to a stack bottom of the application stack that stores the task for the another application.

Further, the process start module 720 is specifically configured to start, in the background, the process of the application identified by the at least one identifier in the target application list, where a size of memory occupied by the started application is not greater than the size of the free memory, and a priority of the application identified by the at least one identifier ranks in the top n of priorities of the applications that are identified by the identifiers stored in the target application list, where n is greater than 0.

Further, the process start module 720 is specifically configured to start, in the background, the process of the application identified by the at least one identifier in the target application list, where a size of memory occupied by the started application identified by the at least one identifier is not greater than the size of the free memory, and a quantity of times of using the application identified by the at least one identifier is not less than a preset quantity of times.

Further, the process start module 720 is configured to start, in the background, a process of an associated application, where the associated application is an application associated with an application that is identified by the at least one identifier and that is in the applications that are identified by the identifiers stored in the target application list.

The described apparatus embodiment is merely an example. The units described as separate parts may or may not be physically separate, and parts displayed as units may or may not be physical units, that is, may be located in one position, or may be distributed on a plurality of network units. Some or all of the modules may be selected according to an actual requirement to achieve the objectives of the solutions of the embodiments. In addition, in the accompanying drawings of the apparatus embodiment provided in the present disclosure, connection relationships between modules indicate that the modules have communication connections with each other, which may be specifically implemented as one or more communications buses or signal cables. A person of ordinary skill in the art may understand and implement the embodiments of the present disclosure without creative efforts.

Based on the foregoing descriptions of the implementations, a person skilled in the art may clearly understand that the application start apparatus described in the embodiments of the present disclosure may be implemented by using software in addition to necessary universal hardware, or certainly may be implemented by using dedicated hardware, including a dedicated integrated circuit, a dedicated CPU, a dedicated memory, a dedicated component, and the like. Generally, any function that can be performed by using a computer program can be easily implemented by using corresponding hardware. Moreover, a specific hardware structure used to implement a same function may be of various forms, for example, an analog circuit, a digital circuit, or a dedicated circuit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A starting method for applications that are closed automatically based on the insufficient memory of the system, comprising:
   receiving, by a terminal, a request for starting a first application;
   releasing, by the terminal, memory occupied by at least one application of a plurality of running applications when a size of the memory requested by the first application is greater than a size of free memory until the size of the free memory is equal to or greater than the size of the memory requested by the first application;
   starting, by the terminal, the first application;
   storing, by the terminal, an application identifier of the at least one application into a target application list;
   obtaining, by the terminal, the target application list when the size of the free memory is greater than a preset threshold;
   starting, in the background by the terminal, a process of a second application identified by at least one identifier in the target application list; and
   starting, in the background by the terminal, an activity of the second application identified by the at least one identifier in the target application list by:
      creating, by the terminal, a new task for the second application; and
      storing, by the terminal, the new task into an application stack when the application stack is comprised in a first stack, where the application stack stores a task for another application different from all applications that are identified by identifiers stored in the target application list, wherein the application stack is located at the top of the first stack, and wherein the new task is stored close to a bottom of the application stack.

2. The method of claim 1, wherein starting, in the background by the terminal, the activity of the second application identified by the at least one identifier in the target application list comprises creating, by the terminal, the application stack when a first stack does not comprise any application stack.

3. The method of claim 1, wherein a size of memory occupied by the second application is not greater than the size of the free memory, where a priority of the second application ranks in a top n of priorities of the applications that are identified by the identifiers stored in the target application list, and wherein n is greater than 0.

4. The method of claim 1, wherein a size of memory occupied by the second application is not greater than the size of the free memory, and wherein a quantity of times of using the second application is not less than a preset quantity of times.

5. The method of claim 1, further comprising starting, in the background by the terminal, a process of an associated application, wherein the associated application is an application associated with the second application.

6. A terminal, comprising:
a processor; and
a memory comprising instructions that when executed by the processor cause the processor to be configured to:
receive a request for starting a first application;
release memory occupied by at least one application of a plurality of running applications when a size of the memory requested by the first application is greater than a size of free memory until the size of the free memory is equal to or greater than the size of the memory requested by the first application;
start the first application;
store an application identifier of the at least one application into a target application list;
obtain the target application list when the size of the free memory is greater than a preset threshold;
start, in the background, a process of a second application identified by at least one identifier in the target application list; and
start, in the background, an activity of the second application identified by the at least one identifier in the target application list, wherein to start the activity of the second application, the instructions further cause the processor to be configured to:
create a new task for the second application; and
store the new task into an application stack when the application stack is comprised in a first stack, where the application stack stores a task for another application different from all applications that are identified by identifiers stored in the target application list, wherein the application stack is located at the top of the first stack, and wherein the new task is stored close to a bottom of the application stack.

7. The terminal of claim 6, wherein the instructions further cause the processor to be configured to create an application stack when a first stack used to store a task does not comprise any application stack.

8. The terminal of claim 6, wherein a size of memory occupied by the second application is not greater than the size of the free memory, wherein a priority of the second application ranks in a top n of priorities of the applications that are identified by the identifiers stored in the target application list, and wherein n is greater than 0.

9. The terminal of claim 6, wherein a size of memory occupied by the second application is not greater than the size of the free memory, and wherein a quantity of times of using the second application is not less than a preset quantity of times.

10. The terminal of claim 6, wherein the instructions further cause the processor to be configured to start, in the background, a process of an associated application, wherein the associated application is an application associated with the second application.

11. A non-transitory computer readable medium configured to store a computer program product comprising computer executable instructions that, when executed by a processor of a terminal, cause the processor to:
receive a request for starting a first application;
release memory occupied by at least one application of a plurality of running applications when a size of the memory requested by the first application is greater than a size of free memory until the size of the free memory is equal to or greater than the size of the memory requested by the first application;
start the first application;
store an application identifier of the at least one application into a target application list;
obtain the target application list when the size of the free memory is greater than a preset threshold;
start, in the background, a process of a second application identified by at least one identifier in the target application list; and
start, in the background by the terminal, an activity of the second application identified by the at least one identifier in the target application list, wherein to start the activity of the second application, the computer executable instructions further cause the processor to:
create a new task for the second application; and
store the new task into an application stack when the application stack is comprised in a first stack, where the application stack stores a task for another application different from all applications that are identified by identifiers stored in the target application list, wherein the application stack is located at the top of the first stack, and wherein the new task is stored close to a bottom of the application stack.

12. The non-transitory computer readable medium of claim 11, wherein a size of memory occupied by the second application is not greater than the size of the free memory, wherein a priority of the second application ranks in the top n of priorities of the applications that are identified by the identifiers stored in the target application list, and wherein n is greater than 0.

13. The non-transitory computer readable medium of claim 11, wherein a size of memory occupied by the second application is not greater than the size of the free memory, and wherein a quantity of times of using the second application is not less than a preset quantity of times.

14. The non-transitory computer readable medium of claim 11, wherein the computer executable instructions further cause the processor to start, in the background, a process of an associated application, wherein the associated application is an application associated with the second application.

15. The non-transitory computer readable medium of claim 11, wherein the computer executable instructions further cause the processor to create the application stack when a first stack used to store a task does not comprise any application stack.

* * * * *